United States Patent
Camarota et al.

(12) 
(10) Patent No.: US 7,018,571 B1
(45) Date of Patent: Mar. 28, 2006

(54) FLAME RETARDANT AND SMOKE SUPRESSIVE ADDITIVE POWDER FOR POLYMERIC THERMOPLASTICS AND THERMOSET RESINS

(75) Inventors: Anthony S. Camarota, Hudson, MA (US); Kevin Schell, State College, PA (US); John B. Rowen, Hudson, MA (US)

(73) Assignee: Avtec Industries, Hudson, MA (US)

( * ) Notice: Subject to any disclaimer, the term of this patent is extended or adjusted under 35 U.S.C. 154(b) by 0 days.

(21) Appl. No.: 09/521,074

(22) Filed: Mar. 7, 2000

(51) Int. Cl.
*C09K 21/04* (2006.01)
*C09K 21/08* (2006.01)
*C09K 5/18* (2006.01)

(52) U.S. Cl. .................. 252/606; 252/602; 252/609; 106/18.16; 106/18.17; 106/18.18; 523/179

(58) Field of Classification Search .............. 252/606, 252/602, 609; 106/18.15, 18.16, 18.17, 18.18, 106/18.2, 18.21; 523/179
See application file for complete search history.

(56) References Cited

U.S. PATENT DOCUMENTS

| | | | | |
|---|---|---|---|---|
| 3,293,327 A | * | 12/1966 | Hechenblerkner et al. | |
| 3,513,114 A | * | 5/1970 | Hahnn et al. | |
| 3,562,197 A | * | 2/1971 | Sears et al. | |
| 3,654,190 A | * | 4/1972 | Levine | |
| 3,914,193 A | * | 10/1975 | Fessler et al. | 106/171 |
| 3,969,291 A | * | 7/1976 | Fukuba et al. | |
| 4,009,137 A | * | 2/1977 | Dany et al. | |
| 4,166,743 A | * | 9/1979 | Wortmann et al. | 252/8.1 |
| 4,247,435 A | * | 1/1981 | Kasten | 106/18.18 |
| 4,743,625 A | * | 5/1988 | Vajs et al. | 521/122 |
| 4,801,625 A | * | 1/1989 | Parr et al. | 523/179 |
| 5,356,568 A | * | 10/1994 | Levine | 252/606 |
| 5,989,706 A | * | 11/1999 | McGinniss et al. | 428/341 |
| 6,084,008 A | * | 7/2000 | Liu | 523/179 |

\* cited by examiner

*Primary Examiner*—Joseph D. Anthony
(74) *Attorney, Agent, or Firm*—Dirk Brinkman

(57) ABSTRACT

A flame retarding and smoke suppressing additive powder that can be mixed with resins includes a carbonific material, a heat activated blowing agent, a heat activated halogen material, a phosphate material, and an inorganic material. The additive powder, when added to a curable or hardenable resin, forms a mixture where the additive powder is about 20–30%, by weight, of the mixture. The resin can be styrenic, olefinic, acrylic, cellulosic, polyester, or polyamide such as are are commonly used in the manufacture of fiberglass reinforced structures and moldable plastics.

3 Claims, No Drawings

FLAME RETARDANT AND SMOKE SUPRESSIVE ADDITIVE POWDER FOR POLYMERIC THERMOPLASTICS AND THERMOSET RESINS

FIELD OF THE INVENTION

This invention relates to flame retardant and smoke suppressive compositions, and more particularly to powdered compositions for mixing with resins.

BACKGROUND OF THE INVENTION

Typically, resins are petroleum by-products that have potentially very harmful burning characteristics, i.e., high flammability at relatively low temperatures, very toxic and acrid smoke, and rapid destructive flame spread. It is well known in the art that the flammability of curable resins can be reduced by incorporation of flame retardant agents. However, when additives are intended for use with curable resins, a multitude of problems arise.

Curable resins are frequently used in the manufacture of reinforced plastics, fiberglass laminates, reenforced plastics used as plenums and cable trays used for housing electrical wiring. Plastics are also widely used by automobile and aircraft manufacturers. The burning behavior of such materials, particularly those that are to be used in an enclosed situation, are of primary concern. Many reinforced plastics can be designed to have a degree of fire resistance. Many additives are available which inhibit burning, but unfortunately, many of these compounds give off very toxic fumes, such as nitrous oxides, cyanide, halogenated compounds etc.

Many prior art references describe the use of a variety of flame retardant additives, see "Modern Plastics Encyclopedia," Vol. 63, No. 10A, McGraw-Hill, Inc., pp. 179–180 (1986). Typical flame retardant agents include reactive or additive halogenated organic compounds, inorganic fillers, solvents, and special formulations based on phosphorous and ammonium salts.

However, the selection of a suitable smoke suppressant for a curable resins is not predictable. Selection is particularly difficult when flame retardants are employed, exacerbated by the complex interaction between the resin and the flame retardant agent. Although efficient in suppressing the rate of combustion of finished products that incorporate the resin, most flame retardants tend to affect adversely one or more key properties of the resin. For example, many flame retardant additives are ineffective at producing low density and low toxicity formulations.

It is well known, that the flame retardant and smoke suppressive properties of additives in resin formulations varies greatly with the nature of substrate. This is particularly true for intumescent compositions because the rapid formation of a protective char is highly dependent upon such factors as the combustion temperature, and the viscosity of the melt formed by the burning substrate.

Other considerations can also come into play, even where the properties of the retardant and suppressive properties of the composition are optimum. These considerations include the effect of the additive on the physical properties, color and molding characteristics of the base resin.

U.S. Pat. No. 3,293,327 describes the production of bicyclic phosphites, phosphonates, thiophosphates, and selenophosphates. These compositions are said to be stabilizers for vinyl halide resins. They are said to be useful as heat stabilizers for vinyl chloride resin, and as antioxidants for fats and oils.

Intumescent, fire-retardant coating compositions containing carbonifics, film-forming binders and phosphorous materials are well known in the art. U.S. Pat. Nos. 3,562,197; 3,513,114; 4,009,137; 4,166,743 and 4,247,435 disclose such compositions containing ammonium polyphosphates as the phosphorous containing material.

U.S. Pat. No. 3,654,190 discloses an intumescent paint comprising a resinous binder, a blowing agent, a phosphorous containing material, a source of chlorine a solvent, an anti-settling agent, a pigment and a surfactant.

U.S. Pat. No. 3,969,291 describes the use of an amide polyphosphate condensate as a fire-retardant additive in an intumescent coating composition. U.S. Pat. No. 3,914,193 discloses the similar use of a crystalline form of melamine pyrophosphate.

U.S. Pat. No. 4,801,625, describe a flame resistant composition having (1) an organic polymeric substance in intimate contact with (2) a bicyclic phosphorous compound, and (3) a gas producing compound. The patent is silent on the use of bicyclic compounds to attain smoke suppressed flame retardant thermoset compositions.

U.S. Pat. No. 5,356,568 describes a solvent-based heat-resistant and fire-retardant coating containing carbonifics, film-forming binders, phosphorous materials. Also described is an application where the coating sprayed on steel and aluminum plates using a gravity flow gun. Not described are any smoke retardant properties, nor the use of the coating with resins or polymer plastics.

The development of additives for use with resins remains a highly empirical art. The predictability of the behavior of the final composition is rare to non-existent. The prior art has largely concentrated on developing highly specific additive combinations for particular resins and end-uses.

Therefore, it is desired to provided an additive composition which exhibits a greater latitude in dispersability, flame retardation, and smoke suppression. It is also desired to provide an additive for use in a variety of resins.

SUMMARY OF THE INVENTION

A flame retarding and smoke suppressing additive powder that can be mixed with curable or hardenable resins, polythermic plastics, and other thermal oxidizable petrochemical based compounds and derivatives. The powder includes a carbonific material, a heat activated blowing agent, a heat activated halogen material, a phosphate material, and an inorganic material.

The additive powder, when added to a curable or hardenable resin, forms a mixture where the additive powder is about 20–30%, by weight, of the mixture.

The resin can be styrenic, olefinic, acrylic, cellulosic, polyester, or polyamide such as are commonly used in the manufacture of fiberglass reinforced structures and moldable plastics.

DETAILED DESCRIPTION OF THE PREFERRED EMBODIMENT

Additive

The invention provides a flame retardant and smoke suppressive powder that can be added to resins and used in manufacturing processes. When the powdery additive according to the invention is mixed with a resin, the propensity of the otherwise untreated resin to combust, generate toxic smoke, and transmit heat when exposed to an open flame or excessive heat is significantly reduced.

The powdered composition according to the invention is "active." By being active, the composition has a latent ability to intumesce or foam when a specific temperature is reached. This is due to the nature of a blowing agent, which is a part of the composition. In a preferred embodiment, that temperature of flame or heat retardation is 250 degrees Centigrade. At this temperature, and above, the cured or hardened resin/composite structure resists combustion, self-extinguishes without the direct application of a flame extinguisher, and produces a smaller quantity of less toxic smoke than similar parts made without use of the invention.

In a preferred embodiment, the composition, by weight, of the additive formulation is:

| Ingredient | Wgt. % Range | Function |
| --- | --- | --- |
| a) Dipentaerythritol | 10.0–12.0 | carbonific |
| b) Melamine | 15.5–17.5 | blowing agent |
| c) Chlorinated Paraffin - 40% | 4.0–6.0 | halogen material |
| d) Chlorinated Paraffin - 70% | 8.0–11.0 | halogen material |
| e) Ammonium polyphosphat | 27.5–29.9 | phosphorous |
| f) Tris(betachloroethyl)phosphate | 2.5–4.5 | phosphorous |
| g) Silica flour (120 mesh | 8.5–10.5 | inorganic |
| h) Glass beads- Zeosphere | 2.5–4.5 | inorganic |
| i) Calcium aluminate cement | 12.5–14.5 | inorganic |

The ingredients of the additive are mixed blended at ambient (room) temperature until fully incorporated. The additive in its final form is a white fine powder.

Each of the components of the composition of the present invention contributes a specific property to the formulation and each is critical to the success of the invention in yielding a reduced propensity for the resin so treated to burn, smoke, generate toxic gases or transmit heat.

Carbonific

In a preferred embodiment, the primary carbonific of the flame retardant composition is dipentaerythritol or tripentaerythritol. The carbonific, simply stated, is a source of carbon. It is the purpose of the carbonific to produce a carbon char layer to insulate the underlying uncombusted resin and finished structure from greater thermal damage. It should be understood, that the resin itself with which the flame retardant additive is mixed can also be a source of carbon, and, thus, a carbonific. In the case where the resin is a carbon, the amount of primary carbonific a) can accordingly be adjusted downward if the resin is to be relied upon as a carbonific for the combustion process. In other embodiments, the carbonific material carbonific material can be selected from the group consisting of dipentaerythritol, pentaerythritol, pentaerythritol polyurethane, phenol, triethylene glycol, resorcinol, inositol, sorbitol, dextrin, and starch.

Blowing Agent

The blowing agent is primarily comprised of melamine. Heat decomposition of the melamine produces ammonia, urea, water, carbon dioxide, etc. These gases act to expand the volume of the resin during combustion. The gases help produce a multicellular foamy resin which insulates and protects the resin and structure from additional heat.

Halogon

The halogen containing material is preferably a chlorinated paraffin, most preferably, a mixture of a chlorinated paraffin containing about 70%, by weight, of chlorine and a chlorinated paraffin containing about 40% by weight, of chlorine. The weight ratio of 70% chlorinated paraffin to 40% chlorinated paraffin is preferably from about 1:2.

The halogen containing material serves several functions. It acts as a carbonific, a blowing agent and a fire snuffing agent. On exposure to heat it is reduced to a char (cabonific) liberating halogen gas (blowing agent) which combines with or scavenges free-radicals generated during rapid oxidation, thus, aiding in the extinguishing of flames (fire snuffing agent). In other embodiments, the heat activated blowing agent is selected from the group consisting of urea, butyl urea, dicyandiamide, benzene sulfonyl-hydrazide, melamine, chloroparaffin, guanidine, and glycine.

Phosphorous

The phosphorous containing materials are ammonium polyphosphate and tris (betachloroethyl) phosphate at approximately a 10:1 ratio. The phosphorous containing material serves as a catalyst to activate the melamine blowing agent and, in addition, reacts with the carbonific, further consuming it and generating carbon. Under the influence of heat from a fire or otherwise, the catalyst decomposes, yielding phosphoric acid. The reactive phosphoric acid produced by the breakdown of the catalyst reacts with both the amine function of the melamine and the hydroxy function of the carbonific to produce water. In addition, under the applied and generated heat, the organic components of the resin composite are degraded producing yet additional insulating char. In other embodiments, the phosphate material is selected from the group consisting of ammonium polyphosphate, tris(2,3-dibromopropyl)phosphate, tris(betachloroethyl)phosphate, quanidine phosphate, urea phosphate, melamine phosphate, monoammonium phosphate, diammonium phosphate, and mixtures thereof.

Inorganic

The heat resistant inorganic material can include a mixture of any suitable heat resistant materials, e.g., silica flour, heat and flame resistant material, e.g., glass beads, etc, and calcium aluminate cement. The inorganic material is also multifunctional. In a resin composition, the inorganic material can enhance the overall strength and impact resistance of a finished product made with the composite resin. As an advantage of the invention, the inorganic material can be tailored for adhesion, flame retardance, and flexibility. The inorganic can also serves as a heat deflector. At extremely high temperatures, the inorganic material melts to form a frit, which is highly insulative and heat resistant.

Resin

The relative weight percentage of the additive to the resin is 20% to 35% based on the amount of flame retardation and smoke suppression that is required. In one application, the additive is mixed with the resins at ambient (room) temperature, and blended until fully incorporated. The additive can also be applied to cured parts, or incorporated directly into resin-based systems.

Unlike the prior art, where the additives are usually highly specific additive combinations for particular resins and end-uses, the additive according to the invention can be mixed with a broad range of classes of resins, a large number of end-uses, and manufacturing processes.

For example, the resin can be a curable or hardenable material, such as a styrenic, olefinic, acrylic, cellulosic, polyester, or polyamide or any other class of resin. In a preferred embodiment, the resin is a styrenic such as those commonly used in the manufacture of fiberglass, reinforced structures.

The resin can also be any class of resins used in resin transfer moldings (RTM), bulk moldings, sheet moldings, fiber reinforced polymer pultrusions, compression moldings, vacuum injection moldings, assisted resin transfer moldings (VARTM), pressure bag moldings, hand lay-ups and spray-ups, filament windings a, cold press moldings, continuous laminating, rotational moldings, encapsulations and preimpregnations.

Test Results

ASTM E-162 (Surface Flammability of Materials Using a Radiant Heat Energy Source) Radiant Panel Test for the surface burning flammability of materials are used by many authorities to determine fire hazards. It is generally accepted that the higher the flamespread numbers the greater the fire hazard. Comparative results for the ASTM protocols are listed in Table A.

TABLE A

| Property | Invention | Typical Prior Art |
| --- | --- | --- |
| Flame Spread Ratio | 10.6 | 25+ |
| Smoke | 3.9 | 300+ |
| Toxicity | None | High |

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A flame retarding and smoke suppressing additive powder, comprising, by weight:
   a carbonific material 10.0–12.0%, in which the carbonific material is selected from the group consisting of dipentaerythritol, pentaerythritol polyurethane, phenol, triethylene glycol, resorcinol, inositol, sorbitol, dextrin, and starch;
   a heat activated blowing agent 15.5–17.5%, in which the heat activated blowing agent is selected from the group consisting of urea, butyl urea, dicyandiamide, benzene sulfonyl-hydrazide, melamine, guanidine, and glycine;
   a heat activated halogen material 12.0–17.0% which forms a fire extinguishing halogen gas under heat, in which the heat activated halogen material is selected from the group of chlorinated paraffin by weight—40% and chlorinated paraffin by weight—70%;
   a phosphate material 30–33.4% which forms water and phosphorous acid when reacting with the remaining ingredients in the powder under heat; and
   an inorganic binder 23.5–29.5%, in which the inorganic binder comprises calcium aluminate cement.

2. The powder of claim 1 wherein the phosphate material is selected from the group consisting of ammonium polyphosphate, tris(2,3-dibromopropyl)phosphate, tris(beta-chloroethyl)phosphate, quanidine phosphate, urea phosphate, melamine phosphate, monoammonium phosphate, diammonium phosphate and mixtures thereof.

3. A flame retarding and smoke suppressing additive powder for mixing with resins comprising, by weight:
   10.0–12.0% of a carbonific comprising of dipentaerythritol, dipentaerythritol, pentaerythritol, pentaerythritol polyurethane, phenol, triethylene glycol, resorcinol, inositol, sorbitol, dextrin, and starch;
   15.5–17.5% of a blowing agent comprising malamine;
   12.0–17.0% of a halogen containing materials comprising chlorinated paraffins;
   30–33.4% of a phosphorous containing material which is selected from the group consisting of ammonium polyphosphate, tris(2,3-dibromopropyl)phosphate, tris (beta-chloroethyl)phosphate, quanidine phosphate, urea phosphate, melamine phosphate, monoammonium phosphate, diammonium phosphate, and mixtures thereof; and
   23.5–29.5% of an inorganic material %, in which the inorganic material comprises calcium aluminate cement.

* * * * *